(12) United States Patent
Lin

(10) Patent No.: US 8,649,420 B2
(45) Date of Patent: Feb. 11, 2014

(54) DATA-PROCESSING MODULE AND METHOD THEREOF

(75) Inventor: Tzu-An Lin, Hsinchu (TW)

(73) Assignee: ITE Tech. Inc., Science Park, Hsinchu (TW)

( * ) Notice: Subject to any disclaimer, the term of this patent is extended or adjusted under 35 U.S.C. 154(b) by 930 days.

(21) Appl. No.: 12/778,103

(22) Filed: May 11, 2010

(65) Prior Publication Data

US 2011/0156601 A1 Jun. 30, 2011

(30) Foreign Application Priority Data

Dec. 31, 2009 (TW) ................................ 98146592 A

(51) Int. Cl.
*H04B 1/38* (2006.01)
(52) U.S. Cl.
USPC .......................................................... 375/220
(58) Field of Classification Search
USPC .................................. 375/372, 220, 219, 326
See application file for complete search history.

(56) References Cited

U.S. PATENT DOCUMENTS

| 6,404,780 | B1 | 6/2002 | Laturell | |
| 2001/0027506 | A1* | 10/2001 | Manning | 711/105 |
| 2002/0135408 | A1 | 9/2002 | Chiu | |
| 2003/0057886 | A1 | 3/2003 | Lys | |
| 2004/0193784 | A1* | 9/2004 | Kirsch | 711/104 |

FOREIGN PATENT DOCUMENTS

| TW | 511043 | 11/2002 |
| TW | 521246 | 2/2003 |
| TW | M265770 | 5/2005 |
| TW | 200822131 | 5/2008 |
| TW | M355396 | 4/2009 |
| TW | M368163 | 11/2009 |

OTHER PUBLICATIONS

Mazières, D; Freedman, M.:"Networks. Direct link networks.", Jul. 6, 2007, URL: http://www.scs.stanford.edu/nyu/04sp/notes/13.pdf, Archiviert in http://www.archive.org am Jul. 6, 2007 [abgerufen am Dec. 8, 2011].
Wall, R.: "ECE 340 Microcontrollers. Serial I/O.", Stand: Nov. 5, 2009, URL: http://www.ee.uidaho.edu/ee/classes/ECE340/notes/Chapter7.pdf [abgerufen am Dec. 8, 2011], pp. 1-40.

* cited by examiner

*Primary Examiner* — Kevin Kim
(74) *Attorney, Agent, or Firm* — Winston Hsu; Scott Margo

(57) ABSTRACT

A data-processing module can handle a predetermined command transmitted by a corresponding main controller through a command serial signal or a clock signal. When the predetermined command represents "command-latching", the data-processing module controls a command register to store the data transmitted by a section of the command serial signal temporarily stored in an FIFO buffering circuit for latching command. When the predetermined command represents "data-latching", the data-processing module controls a command register to store the data transmitted by the section of the command serial signal temporarily stored in the FIFO buffering circuit for latching data. In this way, the data-processing module can control the command register to latch command or the data register to latch data without a redundant pin for receiving latching signals transmitted by the main controller, reducing the cost of the data-processing module.

34 Claims, 10 Drawing Sheets

DATA-PROCESSING MODULE AND METHOD THEREOF

BACKGROUND OF THE INVENTION

1. Field of the Invention

The present invention is related to a data-processing module, and more particularly, to a data-processing module capable of being connected in series to form a cascading data-transmitting system.

2. Description of the Prior Art

Please refer to FIG. 1. FIG. 1 is a diagram illustrating a conventional cascading data-transmitting system 100. The cascading data-transmitting system 100 includes a main controller 110, and data-processing modules $DPM_1 \sim DPM_N$. The main controller 110 is utilized for generating a clock signal $S_{CLK}$, a command serial signal $S_{CMD}$, a command-latching signal $S_{LC}$, and a data-latching signal $S_{LD}$. The data-processing modules $DPM_1 \sim DPM_N$ is utilized for handling the data transmitted by the main controller 110 through the command serial signal $S_{CMD}$. The data-processing modules $DPM_1 \sim DPM_N$ are coupled in series. Each of the data-processing modules $DPM_1 \sim DPM_N$ includes a first-in-first-out (FIFO) buffering circuit, a command register, and a data register.

Please refer to FIG. 2. The structure and the operation principle of the data-processing module $DPM_1$ is illustrated for example. The data-processing module $DPM_1$ includes an FIFO buffering circuit $FBC_1$, a command register $CR_1$, and a data register $DR_1$. The FIFO buffering circuit $FBC_1$ is utilized for transmitting and temporarily storing the command serial signal $S_{CMD}$ according to the clock signal $S_{CLK}$. The FIFO buffering circuit $FBC_1$ includes K buffering units $TU_K \sim TU_K$. The buffering units $TU_1 \sim TU_K$ are coupled in series. Each buffering unit is utilized for temporarily storing one bit of the data transmitted by the command serial signal $S_{CMD}$. When a buffering unit receives the clock signal $S_{CLK}$, the buffering unit transmits the bit presently stored in the buffering unit and the clock signal $S_{CLK}$ to the next-stage buffering unit. For example, the previous stage of the buffering unit $TU_A$ is the buffering unit $TU_{(A+1)}$, and the next stage of the buffering unit $TU_A$ is the buffering unit $TU_{(A-1)}$. It is assumed that at the beginning, the bit of the command serial signal $S_{CMD}$ stored in the buffering unit $TU_{(A+1)}$ represents logic "0"; the bit of the command serial signal $S_{CMD}$ stored in the buffering unit $TU_A$ represents logic "1"; and the bit of the command serial signal $S_{CMD}$ stored in the buffering unit $TU_{(A-1)}$ represents logic "0". When the buffering units $TU_{(A+1)}$, $TU_A$, and $TU_{(A-1)}$ receive the clock signal $S_{CLK}$, the buffering unit $TU_A$ outputs the bit, which is stored in the buffering unit $TU_A$ and represents logic "1", to the next-stage buffering unit $TU_{(A-1)}$, and simultaneously receives and stores the bit, which is outputted by the previous-stage buffering unit $TU_{(A+1)}$ and represents logic "0". Meanwhile, the bit stored in the buffering unit $TU_A$ represents logic "0", and the bit stored in the buffering unit $TU_{(A-1)}$ represents logic "1". The command register $CR_1$ is utilized for latching command according to the command-latching signal $S_{LC}$ transmitted by the main controller 110. More particularly, when the command register $CR_1$ receives the command-latching signal $S_{LC}$ transmitted by the main controller 110, the command register $CR_1$ stores the data transmitted by the command serial signal $S_{CMD}$ temporarily stored in the FIFO buffering circuit $FBC_1$ (that is, the command register $CR_1$ stores the data temporarily stored in the buffering units $TU_1 \sim TU_K$). The data register $DR_1$ is utilized for latching data according to the data-latching signal $S_{LD}$ transmitted by the main controller 110. More particularly, when the data register $DR_1$ receives the data-latching signal $S_{LD}$ transmitted by the main controller 110, the data register $DR_1$ stores the data transmitted by the command serial signal $S_{CMD}$ temporarily stored in the FIFO buffering circuit $FBC_1$ (that is, the data register $DR_1$ stores the data temporarily stored in the buffering units $TU_1 \sim TU_K$).

In general, the data-processing module is realized by a chip. However, according to the above-mentioned description, the data-processing module requires an additional pin as a latching pin for receiving the latching signals (the command-latching signal and the data-latching signal) transmitted by the main controller, so as to control the command register to latch command or control the data register to latch data. Hence, the cost of the data-processing module increases. Since in the cascading data-transmitting system, the number of the data-processing modules is quite large, the additional pin required by the data-processing module vastly increases the cost of the cascading data-transmitting system, causing a great inconvenience.

SUMMARY OF THE INVENTION

The present invention provides a data-processing module. The data-processing module is utilized for handling a command serial signal. The data-processing module is capable of being connected in series so as to form a cascading data-transmitting system. The data-processing module comprises a command register, a data register, a first-in-first-out (FIFO) buffering circuit, and a logic-determining circuit. The FIFO buffering circuit is utilized for transmitting and temporarily storing the command serial signal according to a clock signal. The logic-determining circuit is utilized for determining if a first section of the command serial signal is a predetermined command according to a first bit, a second bit, and a third bit of the first section of the command serial signal temporarily stored in the FIFO buffering circuit. The first bit is adjacent to the second bit, and the second bit is adjacent to the third bit. When the first, the second, and the third bits conform to a data type, the logic-determining circuit determines the first section is the predetermined command, and the logic-determining circuit controls the command register or the data register to store data transmitted by a second section of the command serial signal.

The present invention further provides a data-processing module. The data-processing module is utilized for handling a command serial signal. The data-processing module is capable of being connected in series so as to form a cascading data-transmitting system. The data-processing module comprises a command register, a data register, a first-in-first-out (FIFO) buffering circuit, and a frequency-determining circuit. The FIFO buffering circuit is utilized for transmitting and temporarily storing the command serial signal according to a clock signal. The frequency-determining circuit is utilized for detecting a frequency of the clock signal so as to control the command register or the data register to store data transmitted by the command serial signal.

The present invention further provides a data-processing module. The data-processing module is utilized for handling a command serial signal. The data-processing module is capable of being connected in series so as to form a cascading data-transmitting system. The data-processing module comprises a command register, a data register, a first-in-first-out (FIFO) buffering circuit, a frequency-detecting circuit, and a command-handling circuit. The FIFO buffering circuit is utilized for transmitting and temporarily storing the command serial signal according to a clock signal. The frequency-detecting circuit is utilized for detecting a frequency of the clock signal so as to generate a predetermined-frequency signal. When the frequency-detecting circuit determines the frequency of the clock signal is equal to a predetermined frequency, the frequency-detecting circuit generates the predetermined-frequency signal. The command-handling circuit is utilized for determining if a first section of the command serial signal is a predetermined command according to the predetermined-frequency signal, and controlling the command register or the data register to store data transmitted by a second section of the command serial signal according the predetermined command.

The present invention further provides a data-processing method applied in a data-processing module. The data-processing module has a command register, a data register, and a first-in-first-out (FIFO) buffering circuit. The FIFO buffering circuit transmits and temporarily stores a command serial signal according to a clock signal. The FIFO buffering circuit has a first buffer and a second buffer. The first buffer is utilized for temporarily storing a first section of the command serial signal. The second buffer is utilized for temporarily storing a second section of the command serial signal. The first section of the command serial signal stored in the first buffer has a first bit, a second bit, and a third bit. The first bit is adjacent to the second bit. The second bit is adjacent to the third bit. The data-processing method comprises determining the first section is a predetermined command when the first, the second, and the third bits conform to a data type, controlling the command register to store data transmitted by the second section of the command serial signal stored in the second buffer when the predetermined command represents command-latching, and controlling the data register to store the data transmitted by the second section of the command serial signal stored in the second buffer when the predetermined command represents data-latching.

The present invention further provides a data-processing method applied in a data-processing module. The data-processing module has a command register, a data register, and a first-in-first-out (FIFO) buffering circuit. The FIFO buffering circuit transmits and temporarily stores a command serial signal according to a clock signal. The FIFO buffering circuit has a first buffer. The first buffer is utilized for temporarily storing the command serial signal. The data-processing method comprise controlling the command register to store data transmitted by the command serial signal stored in the first buffer when determining a frequency of the clock signal is equal to a first predetermined frequency, and controlling the data register to store the data transmitted by the command serial signal stored in the first buffer when determining the frequency of the clock signal is equal to a second predetermined frequency.

The present invention further provides a data-processing method applied in a data-processing module. The data-processing module has a command register, a data register, and a first-in-first-out (FIFO) buffering circuit. The FIFO buffering circuit transmits and temporarily stores a command serial signal according to a clock signal. The FIFO buffering circuit has a first buffer and a second buffer. The first buffer is utilized for temporarily storing a first section of the command serial signal. The second buffer is utilized for temporarily storing a second section of the command serial signal. The data-processing method comprises determining the first section of the command serial signal stored in the first buffer is a predetermined command when determining a frequency of the clock signal is equal to a predetermined-frequency, controlling the command register to store data transmitted by the second section of the command serial signal stored in the second buffer when the predetermined command represents command-latching, and controlling the data register to store the data transmitted by the second section of the command serial signal stored in the second buffer when the predetermined command represents data-latching.

These and other objectives of the present invention will no doubt become obvious to those of ordinary skill in the art after reading the following detailed description of the preferred embodiment that is illustrated in the various figures and drawings.

DETAILED DESCRIPTION

The present invention provides a data-processing module. The data-processing module handles a predetermined command transmitted by a corresponding main controller through a command serial signal or a clock signal. The data-processing module controls the command register storing the data transmitted by the command serial signal temporarily stored in the FIFO buffering circuit so as to latch command, or controls the data register storing the data transmitted by the command serial signal temporarily stored in the FIFO buffering circuit so as to latch data, according to the predetermined command. In this way, even if the data-processing module of the present invention does not have the additional pin (the latch pin utilized for receiving the latch signals transmitted by the main controller), the data-processing module of the present invention still can control the command register to latch command or control the data register to latch data. As a result, the cost of the data-processing module is reduced.

Figure 1:
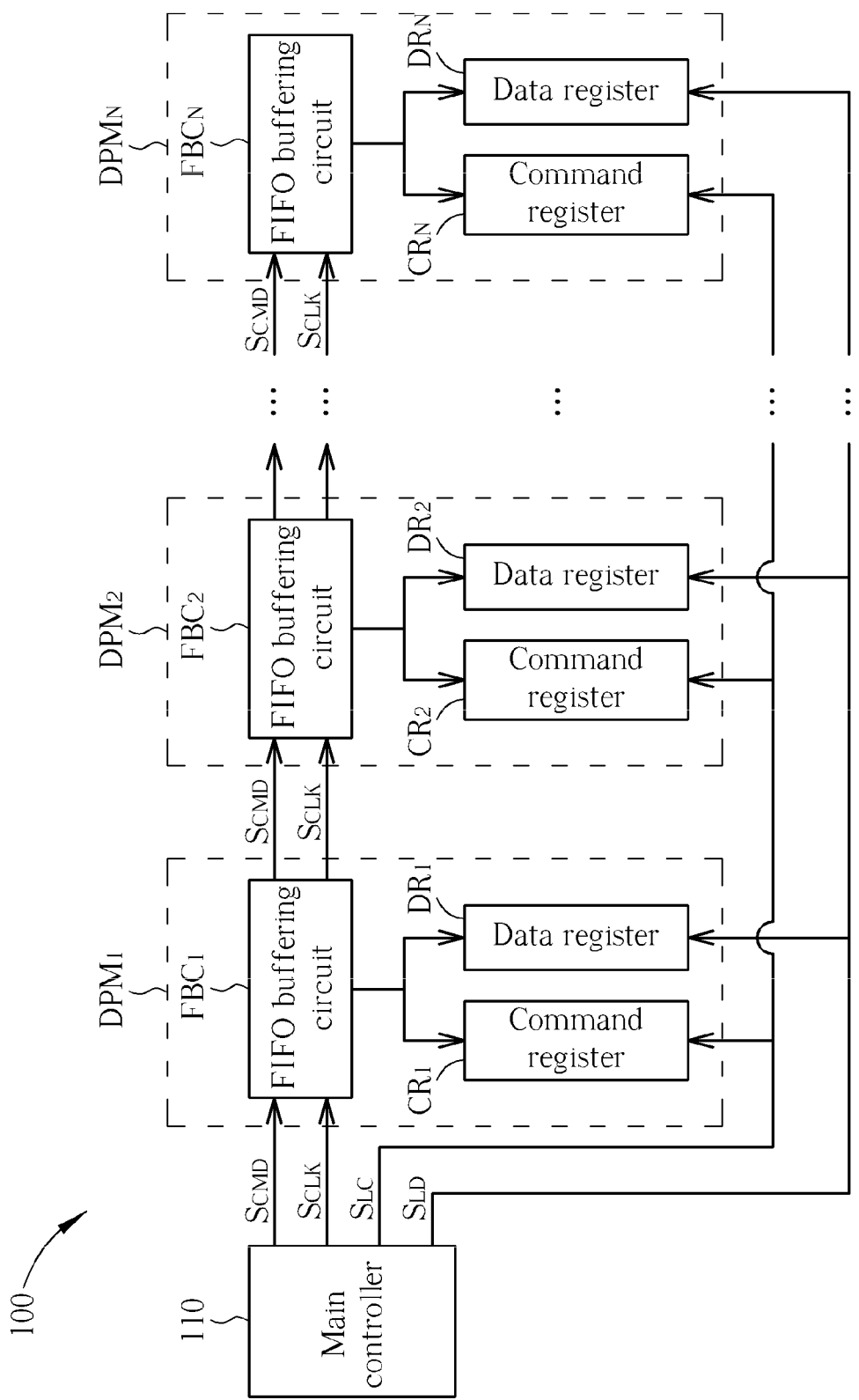
FIG. 1 is a diagram illustrating a conventional cascading data-transmitting system.
Figure 2:
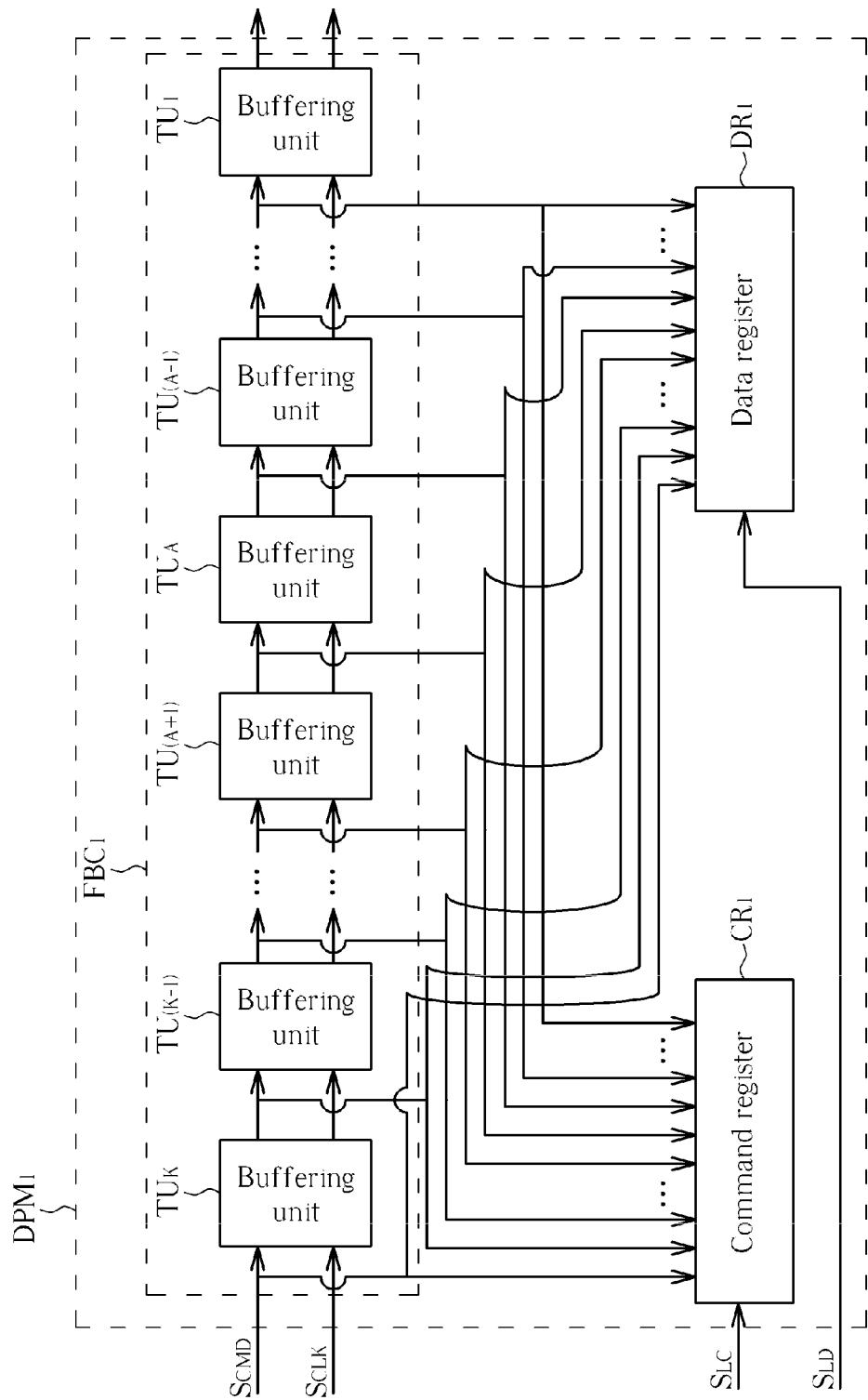
FIG. 2 is a diagram illustrating a conventional data-processing module.
Figure 3:
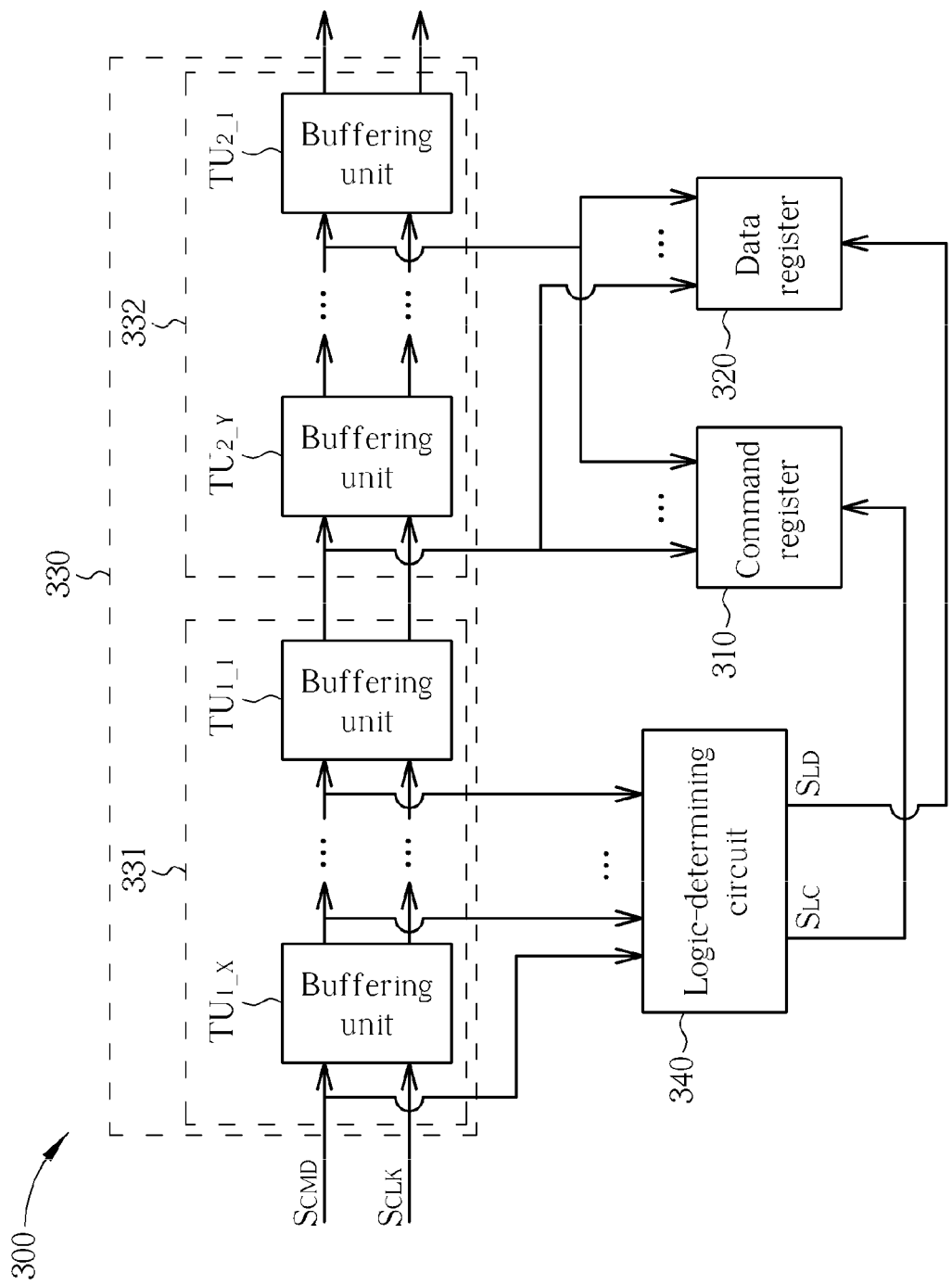
FIG. 3 is a diagram illustrating a data-processing module according to a first embodiment of the present invention.

Please refer to FIG. 3. FIG. 3 is a diagram illustrating a data-processing module 300 according to a first embodiment of the present invention. The data-processing module 300 includes a command register 310, and a data register 320, an FIFO buffering circuit 330, and a logic-determining circuit 340. The command register 310 is utilized for latching command. The data register 320 is utilized for latching data. The FIFO buffering circuit 330 is utilized for transmitting and temporarily storing the command serial signal $S_{CMD}$ according to the clock signal $S_{CLK}$. The FIFO buffering circuit 330 includes buffers 331 and 332. The buffer 331 includes buffering units $TU_{1\_1} \sim TU_{1\_X}$. The buffer 331 is utilized for temporarily storing a first section $SEC_1$ of the command serial signal $S_{CMD}$. The first section $SEC_1$ of the command serial signal $S_{CMD}$ includes X-bit data. The buffer 332 includes buffering units $TU_{2\_1} \sim TU_{1\_Y}$. The buffer 332 is utilized for temporarily storing a second section $SEC_2$ of the command serial signal $S_{CMD}$. The second section $SEC_2$ of the command serial signal $S_{CMD}$ includes Y-bit data. The logic-determining circuit 340 is utilized for determining if the first section $SEC_1$ of the command serial signal $S_{CMD}$ stored in the buffer 331 is a predetermined command $CMD_{PRE}$ according to the three adjacent bits of the first section $SEC_1$ stored in the buffer 331 (for example, the three adjacent bits are the bits $BIT_1 \sim BIT_3$ respectively stored in the buffering units $TU_{1\_1} \sim TU_{1\_3}$), and generating a command-latching signal $S_{LC}$ or a data-latching signal $S_{LD}$ so as to control the command register 310 latching command or control the data register 320 latching data. The operation principle of the data-processing module 300 is further illustrated as below.

The type of the content transmitted by command serial signal $S_{CMD}$ includes the predetermined command $CMD_{PRE}$ and the data DA. When the main controller corresponding to the data-processing module 300 transmits the predetermined command $CMD_{PRE}$ through the command serial signal $S_{CMD}$, the bits $BIT_1 \sim BIT_3$ temporarily stored in the buffering units $TU_{1\_1} \sim TU_{1\_3}$ conform to a predetermined data type $TYPE_{PRE}$. More particularly, when the logic of the bit $BIT_1$ stored in the buffering unit $TU_{1\_1}$ is the same as the logic of the bit $BIT_3$ stored in the buffering unit $TU_{1\_3}$, and the logic of the bit $BIT_1$ stored in the buffering unit $TU_{1\_1}$ is different from the logic of the bit $BIT_2$ stored in the buffering unit $TU_{1\_2}$, it means the bits $BIT_1 \sim BIT_3$ temporarily stored in the buffering units $TU_{1\_1} \sim TU_{1\_3}$ conform to the predetermined data type $TYPE_{PRE}$. For example, the bit $BIT_1$ temporarily stored in the buffering unit $TU_{1\_1}$ and the bit $BIT_3$ temporarily stored in the buffering unit $TU_{1\_3}$ both represent the logic "1", and the bit $BIT_2$ temporarily stored in the buffering unit $TU_{1\_2}$ represents the logic "0"; or the bit $BIT_1$ temporarily stored in the buffering unit $TU_{1\_1}$ and the bit $BIT_3$ temporarily stored in the buffering unit $TU_{1\_3}$ both represent the logic "0", and the bit $BIT_2$ temporarily stored in the buffering unit $TU_{1\_2}$ represents the logic "1". In other words, when the bits $BIT_1 \sim BIT_3$ stored in the buffering units $TU_{1\_1} \sim TU_{1\_3}$ represent [010] or [101], the logic-determining circuit 340 determines the first section $SEC_1$ stored in the buffer 331 is the predetermined command $CMD_{PRE}$. Meanwhile, the logic-determining circuit 340 generates the command-latching signal $S_{LC}$ or the data-latching signal $S_{LD}$ according to the predetermined command $CMD_{PRE}$. In the present embodiment, when the main controller transmits the data DA through the command serial signal $S_{CMD}$, each bit of the data DA is outputted twice. That is, when a bit of the data DA represents the logic "0", the bit is transmitted by the command serial signal $S_{CMD}$ transmitting [00]; when a bit of the data DA represents the logic "1", the bit is transmitted by the command serial signal $S_{CMD}$ transmitting [11]. For example, if the data DA actually transmitted by the main controller is [01101110], then the content of the command serial signal $S_{CMD}$ generated by the main controller is [0011110011111100]. It can be seen that when the main controller transmits the data DA through the command serial signal $S_{CMD}$, it is impossible for the pattern of [101] or [010] to exist in the content of the command serial signal $S_{CMD}$. Thus, the logic-determining circuit 340 determines if the bits $BIT_1 \sim BIT_3$ stored in the buffering units $TU_{1\_1} \sim TU_{1\_3}$ of the buffer 331 conform to the predetermined data type $TYPE_{PRE}$ by means of detecting the pattern of [101] or [010], so as to accordingly determine if the first section $SEC_1$ of the command serial signal $S_{CMD}$ stored in the buffer 331 is the predetermined command $CMD_{PRE}$.

Furthermore, the logic-determining circuit 340 can detect the bits $BIT_1$ and $BIT_2$ stored in the buffering units $TU_{1\_1}$ and $TU_{1\_2}$ at first. When the bits $BIT_1$ and $BIT_2$ represent different logic, that is, when the bits $BIT_1$ and $BIT_2$ represent [01] or [10], the logic-determining circuit 340 enters a trigger state. When the logic-determining circuit 340 is in the trigger state, the logic-determining circuit 340 determines if the first section $SEC_1$ of the command serial signal $S_{CMD}$ stored in the buffer 331 is the predetermined command $CMD_{PRE}$ according to the logic represented by the bit $BIT_3$. When the logic of the bit $BIT_3$ is different from that of the bit $BIT_2$, the logic-determining circuit 340 determines the first section $SEC_1$ of the command serial signal $S_{CMD}$ stored in the buffer 331 is the predetermined command $CMD_{PRE}$. When the predetermined command $CMD_{PRE}$ represents "command-latching", the logic-determining circuit 340 generates the command-latching signal $S_{LC}$ for controlling the command register 310 storing the data DA transmitted by the section $SEC_2$ of the command serial signal $S_{CMD}$ temporarily stored in the buffer 332, so as to latch command. For example, when the content of the second section $SEC_2$ is [0011110011111100], it means the data DA actually transmitted by the main controller is [01101110]. For obtaining the data DA actually transmitted by the main controller, the command register 310 only reads the content stored in the odd buffering units $TU_{2\_1}$, $TU_{2\_3}$, $TU_{2\_5}$ and so on, or only reads the content stored in the even buffering units $TU_{2\_2}$, $TU_{2\_4}$, $TU_{2\_6}$ and so on. In this way, the command register 310 can obtain the data DA having the content [01101110]. That is, the command register 310 can obtain the data DA actually transmitted by the main controller. Similarly, when the predetermined command $CMD_{PRE}$ represents "data-latching", the logic-determining circuit 340 generates the data-latching signal $S_{LD}$ for controlling the data register 320 storing the data DA transmitted by the section $SEC_2$ of the command serial signal $S_{CMD}$ temporarily stored in the buffer 332, so as to latch data. For example, the content of the second section $SEC_2$ is [0011110011111100]. For obtaining the data DA actually transmitted by the main controller, the data register 320 only reads the content stored in the odd buffering units ($TU_{2\_1}$, $TU_{2\_3}$, $TU_{2\_5}$ and so on), or only reads the content stored in the even buffering units ($TU_{1\_2}$, $TU_{2\_4}$, $TU_{2\_6}$ and so on). In this way, the data register 320 can obtain the data DA having the content [01101110]. That is, the data register 320 can obtain the data DA actually transmitted by the main controller.

The command serial signal $CMD_{PRE}$ can be realized in various ways. The present invention provides some embodiments illustrated as below.

In an embodiment, the predetermined command $CMD_{PRE}$ includes three bits, and the buffer 331 includes three buffering units $TU_{1\_1} \sim TU_{1\_3}$. When the content of the predetermined command $CMD_{PRE}$ is [101], the predetermined command $CMD_{PRE}$ represents "command-latching"; when the content of the predetermined command $CMD_{PRE}$ is [010], the predetermined command $CMD_{PRE}$ represents "data-latching". Therefore, when the predetermined command $CMD_{PRE}$ has been already transmitted to the buffer 331, the logic-determining circuit 340 detects if the bits $BIT_1 \sim BIT_3$ stored in the buffering units $TU_{1\_1} \sim TU_{1\_3}$ conform to the above-mentioned data type $TYPE_{PRE}$ so as to determine if the content stored in the buffer 331 is the predetermined command $CMD_{PRE}$. The logic-determining circuit 340 further determines the predetermined command $CMD_{PRE}$ represents "command-latching" or "data-latching" so as to accordingly control the command register 310 or the data register 320 to store the data DA transmitted by the second section $SEC_2$ of the command serial signal $S_{CMD}$. In addition, the above-mentioned pattern ([010] and [101]) of the predetermined command $CMD_{PRE}$ avoids the error generated by the logic-determining circuit 340. For example, if the content of the predetermined command $CMD_{PRE}$ is designed to be [110] for representing "command-latching" and to be [011] for representing "data-latching", the logic-determining circuit 340 can not correctly determine that the main controller transmits the predetermined command $CMD_{PRE}$ or the data DA. For instance, when the content of the data DA transmitted by the main controller is [1100], the logic-determining circuit 340 determines the main controller transmits the predetermined command $CMD_{PRE}$ representing "command-latching" because the first three bits of the data DA is [110]; when the content of the data DA transmitted by the main controller is [0011], the logic-determining circuit 340 determines the main controller transmits the predetermined command $CMD_{PRE}$ representing "data-latching" because the last three bits of the data DA is [011]. Consequently, the pattern of the content of the predetermined command $CMD_{PRE}$ has to be designed properly for avoiding the determining error generated by the logic-determining circuit 340.

In another embodiment, the predetermined command $CMD_{PRE}$ includes six bits, and the buffer 331 includes six buffering units $TU_{1\_1} \sim TU_{1\_6}$. The pattern of the predetermined command $CMD_{PRE}$ can be designed that when the content of the predetermined command $CMD_{PRE}$ is [101010], the predetermined command $CMD_{PRE}$ represents "command-latching"; when the content of the predetermined command $CMD_{PRE}$ is [101110], the predetermined command $CMD_{PRE}$ represents "data-latching". Or, the pattern of the predetermined command $CMD_{PRE}$ can be designed that when the content of the predetermined command $CMD_{PRE}$ is [101010], the predetermined command $CMD_{PRE}$ represents "data-latching"; when the content of the predetermined command $CMD_{PRE}$ is [101110], the predetermined command $CMD_{PRE}$ represents "command-latching". When the predetermined command $CMD_{PRE}$ has been already transmitted to the buffer 331, the logic-determining circuit 340 detects if the bits $BIT_1 \sim BIT_3$ stored in the buffering units $TU_{1\_1} \sim TU_{1\_3}$ conform to the above-mentioned data type $TYPE_{PRE}$ so as to determine if the content stored in the buffer 331 is the predetermined command $CMD_{PRE}$. Then, the logic-determining circuit 340 further determines the predetermined command $CMD_{PRE}$ represents "command-latching" or "data-latching" according to the bits $BIT_1 \sim BIT_6$ stored in the buffering units $TU_{1\_1} \sim TU_{1\_6}$, so as to accordingly control the command register 310 or the data register 320 to store the data DA transmitted by the second section $SEC_2$ of the command serial signal $S_{CMD}$ temporarily stored in the buffer 332. In addition, the above-mentioned pattern of the predetermined command $CMD_{PRE}$ also can avoid the determining error generated by the logic-determining circuit 340.

Hence, according to the above-mentioned description, the data-processing module 300 can latch command or lath data directly according to the predetermined command $CMD_{PRE}$ transmitted by the command serial signal $S_{CMD}$, and the data-processing module 300 does not need an additional pin (as the latch pin) to receive the latch signals transmitted by the main controller. In this way, compared with the conventional data-processing module, the cost of the data-processing module 300 is reduced.

Figure 4:
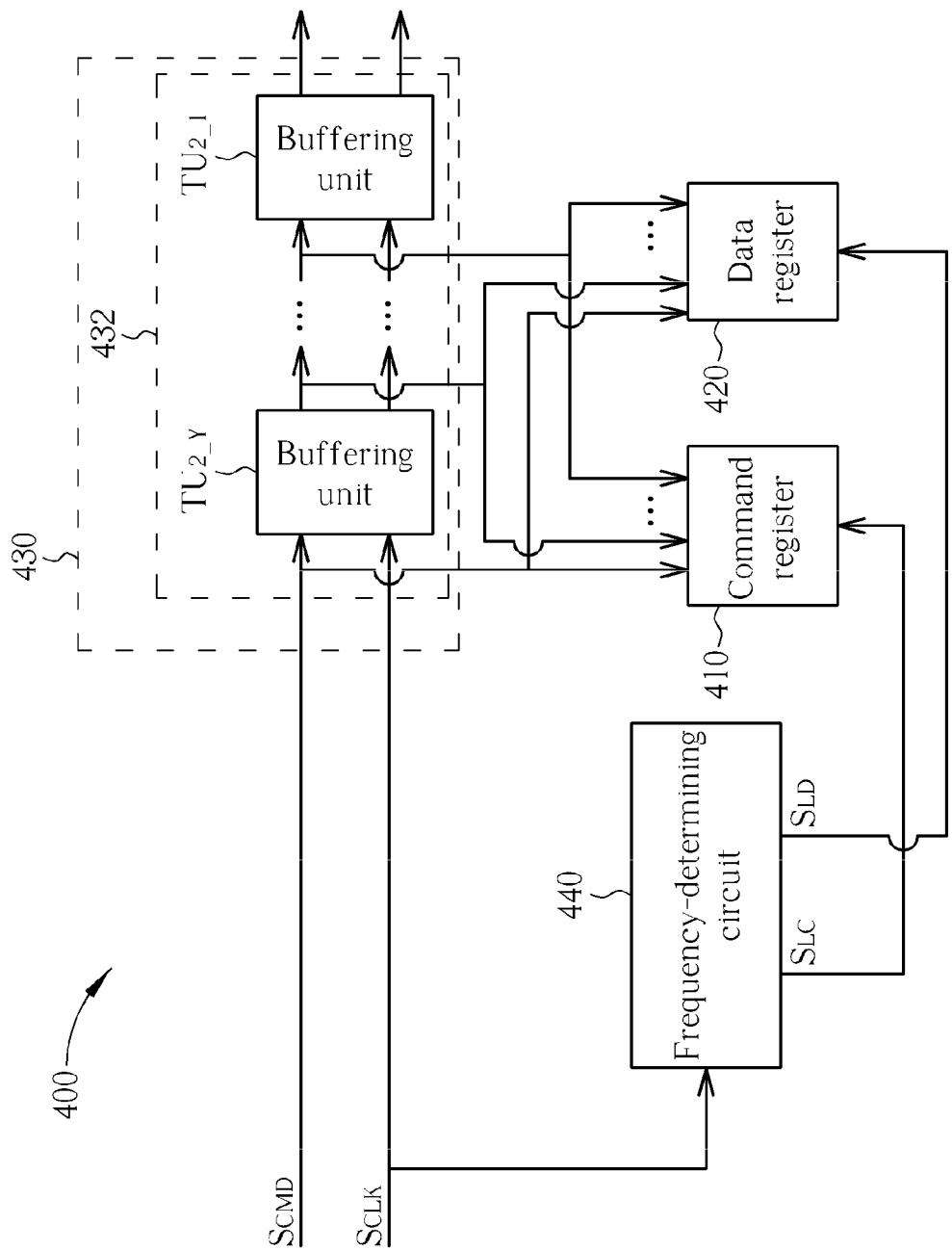
FIG. 4 is a diagram illustrating a data-processing module according to a second embodiment of the present invention.

Please refer to FIG. 4. FIG. 4 is a diagram illustrating a data-processing module 400 according to a second embodiment of the present invention. The data-processing module 400 includes a command register 410, a data register 420, an FIFO buffering circuit 430, and a frequency-determining circuit 440. Compared with the FIFO buffering circuit 330, the FIFO buffering circuit 430 of the data-processing module 400 only includes a buffer 432. The structure and the operation principle of the command register 410, the data register 420, and the buffer 432 are respectively similar to those of the command register 310, the data register 320, and the buffer 332, and will be omitted for brevity. In the present embodiment, the main controller corresponding to the data-processing module 400 transmits the predetermined command $CMD_{PRE}$ to the data-processing module 400 by means of changing the frequency of the clock signal $S_{CLK}$. More particularly, when the main controller transmits the predetermined command $CMD_{PRE}$ through the command serial signal $S_{CMD}$, the frequency of the clock signal $S_{CLK}$ is changed by the main controller to be equal to the predetermined frequency $FREQ_1$ or the predetermined frequency $FREQ_2$; when the main controller transmits the data DA through the command serial signal $S_{CMD}$, the frequency of the clock signal $S_{CLK}$ is changed by the main controller to be equal to the predetermined frequency $FREQ_3$. As a result, the frequency-determining circuit 440 generates the command-latching signal $S_{LC}$ or the data-latching signal $S_{LD}$ according to the frequency of the clock signal $S_{CLK}$. For example, when the frequency-determining circuit 440 determines the frequency of the clock signal $S_{CLK}$ is equal to the predetermined frequency $FREQ_1$, the frequency-determining circuit 440 determines the command serial signal SCMD transmits the predetermined command $CMD_{PRE}$ representing "command-latching". Hence, the frequency-determining circuit 440 generates the command-latching signal $S_{LC}$ to control the command register 410 storing the data DA transmitted by the second section $SEC_2$ of the command serial signal $S_{CMD}$ temporarily stored in the buffer 432, for latching command. When the frequency-determining circuit 440 determines the frequency of the clock signal $S_{CLK}$ is equal to the predetermined frequency $FREQ_2$, the frequency-determining circuit 440 determines the command serial signal SCMD transmits the predetermined command $CMD_{PRE}$ representing "data-latching". Thus, the frequency-determining circuit 440 generates the data-latching signal $S_{LD}$ to control the data register 420 storing the data DA transmitted by the second section $SEC_2$ of the command serial signal $S_{CMD}$ temporarily stored in the buffer 432, for latching data. To sum up, in the present embodiment, Instead of transmitting the predetermined command $CMD_{PRE}$ through the first section $SEC_1$ of the command serial signal $S_{CMD}$, the main controller transmits the predetermined command $CMD_{PRE}$ by means of changing the frequency of the clock signal $S_{CLK}$. Consequently, no data exists in the first section $SEC_1$ of the command serial signal $S_{CMD}$ of the main controller. In this way, the FIFO buffering circuit 430 of the data processing module 400 only requires the buffer 432 for storing the second section $SEC_2$ of the command serial signal $S_{CMD}$.

In addition, it is noticeable that compared with the data processing module 300, in the data processing module 400, when the main controller transmits the data DA, the bits of the data DA are not outputted twice. For example, when the data DA transmitted by the main controller through the command serial signal $S_{CMD}$ is [01101110], the second section $SEC_2$ of the command serial signal $S_{CMD}$ stored in the buffer 432 is [01101110] as well. In other words, the number of the buffering units in the buffer 432 is equal to the number of the bits in the data DA, and does not have to be twice as the number of the bits in the data DA.

Figure 5:
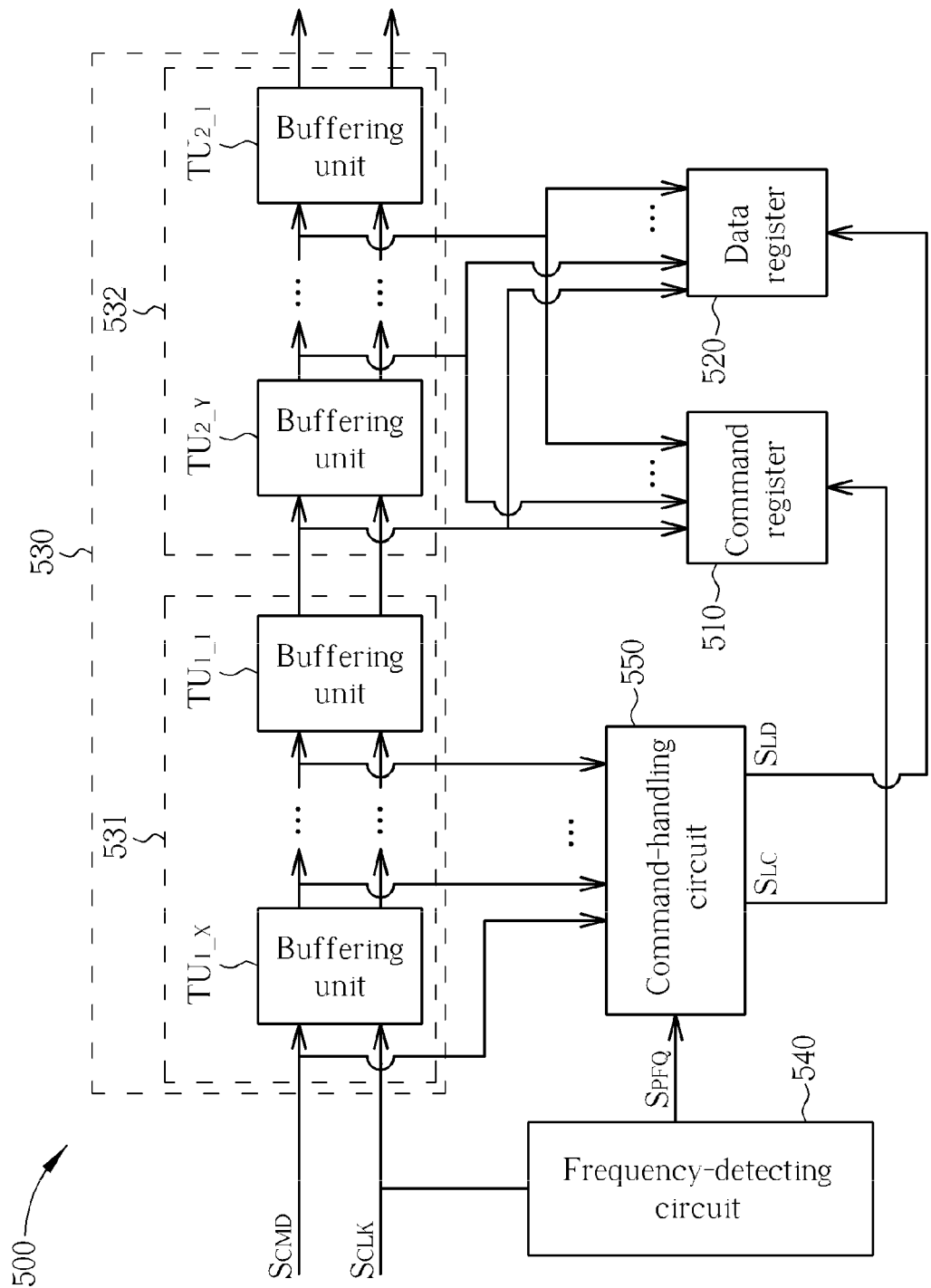
FIG. 5 is a diagram illustrating a data-processing module according to a third embodiment of the present invention.

Please refer to FIG. 5. FIG. 5 is a diagram illustrating a data-processing module 500 according to a third embodiment of the present invention. The data-processing module 500 includes a command register 510, a data register 520, an FIFO buffering circuit 530, a frequency-detecting circuit 540, and a command-handling circuit 550. The FIFO buffering circuit 530 includes buffers 531 and 532. The structure and the operation principle of the command register 510, the data register 520, the FIFO buffering circuit 530, and the buffers 531 and 532 are respectively similar to those of the command register 310, the data register 320, the FIFO buffering circuit 330, and the buffers 331 and 332, and will be omitted for brevity. In the present embodiment, when the main controller transmits the predetermined command $CMD_{PRE}$ through the command serial signal $S_{CMD}$, the frequency of the clock signal $S_{CLK}$ generated by the main controller is equal to the predetermined frequency $FREQ_4$; when the main controller transmits the data DA through the command serial signal $S_{CMD}$, the frequency of the clock signal $S_{CLK}$ generated by the main controller is equal to the predetermined frequency $FREQ_5$. Therefore, the frequency-detecting circuit 540 determines the frequency of the clock signal $S_{CLK}$ is equal to the predetermined frequency $FREQ_4$, the frequency-detecting circuit 540 generates the predetermined-frequency signal $S_{PFQ}$. In this way, when the command-controlling circuit 550 receives the predetermined-frequency signal $S_{PFQ}$, the command-controlling circuit 550 determines the first section $SEC_1$ of the command serial signal $CMD_{PRE}$ presently stored in the buffer 531 is the predetermined command $CMD_{PRE}$. The command-controlling circuit 550 can further determine the predetermined command $CMD_{PRE}$ represents "command-latching" or "data-latching" according to the content of the first section $SEC_1$. For example, when the content of the first section $SEC_1$ is [1111], the predetermined command $CMD_{PRE}$ represents "command-latching"; when the content of the first section $SEC_1$ is [0000], the predetermined command $CMD_{PRE}$ represents "data-latching". Similarly, when the predetermined command $CMD_{PRE}$ represents "command-latching", the command-handling circuit 550 generates the command-latching signal $S_{LC}$ to control the command register 510 storing the data DA transmitted by the second section $SEC_2$ of the command serial signal $S_{CMD}$ stored in the buffer 532, for latching command. When the predetermined command $CMD_{PRE}$ represents "data-latching", the command-handling circuit 550 generates the data-latching signal $S_{LD}$ to control the data register 520 storing the data DA transmitted by the second section $SEC_2$ of the command serial signal $S_{CMD}$ stored in the buffer 532, for latching data. In addition, compared with the data processing module 300, in the data processing module 500, when the main controller transmits the data DA, the bits of the data DA are not outputted twice. Therefore, in the data-processing module 500, the number of the buffering units in the buffer 532 is equal to the number of the bits in the data DA, and does not have to be twice as the number of the bits in the data DA.

Figure 6:
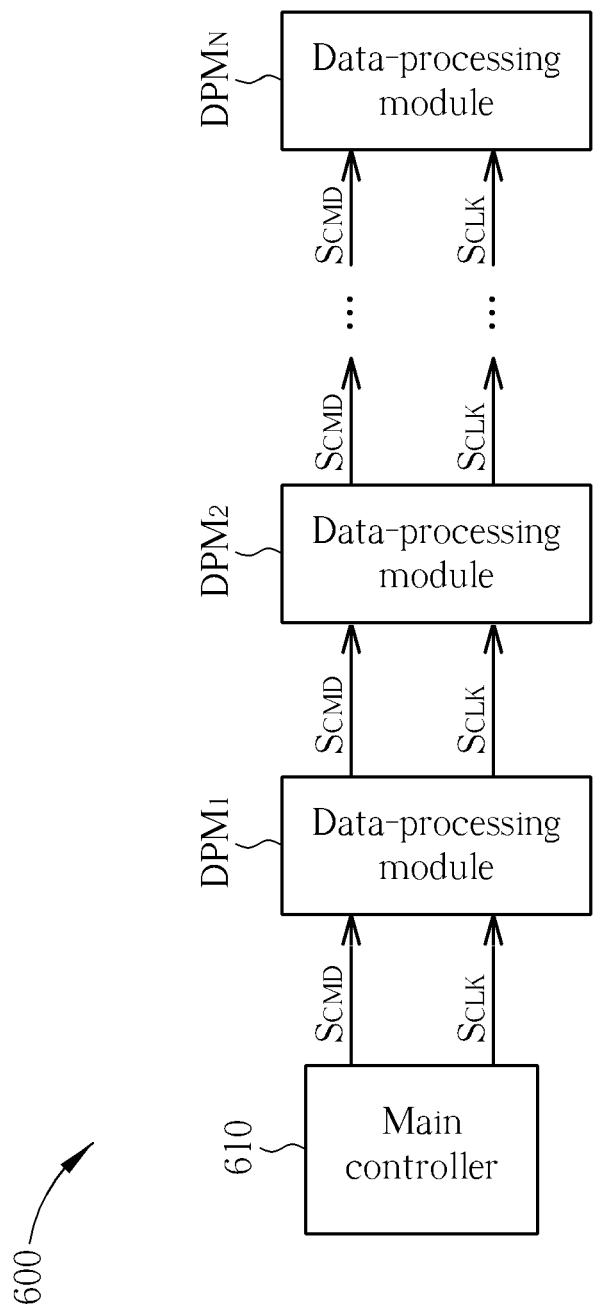
FIG. 6 is a diagram illustrating a cascading data-transmitting system according to an embodiment of the present invention.

Please refer to FIG. 6. FIG. 6 is a diagram illustrating a cascading data-transmitting system 600 according to an embodiment of the present invention. The cascading data-transmitting system 600 includes a main controller 610, and data-processing modules $DPM_1 \sim DPM_N$. The main controller 610 is utilized for generating the clock signal $S_{CLK}$, and the command serial signal $S_{CMD}$. The structure and the operation principle of the data-processing modules $DPM_1 \sim DPM_N$ are similar to those of the data-processing modules 300, 400, or 500, and will not be repeated again for brevity. The FIFO buffering circuits of the data-processing modules $DPM_1 \sim DPM_N$ are coupled in series. Compared with the conventional cascading data-processing system, in the data-transmitting system 600, each data-processing module $DPM_1 \sim DPM_N$ does not require an additional pin (as the latch pin) utilized for receiving the latching signals transmitted by the main controller, and each data-processing module $DPM_1 \sim DPM_N$ still can control the corresponding command register to latch command, or control the corresponding data register to latch data. Thus, the cost of the data-transmitting system 600 is reduced.

In addition, on the basis of the data-processing module provided by the present invention, the present invention further provides a light-emitting module capable of being applied in the large display system. The structure and operational principle of the light-emitting module provided by the present invention are illustrated as below.

Figure 7:
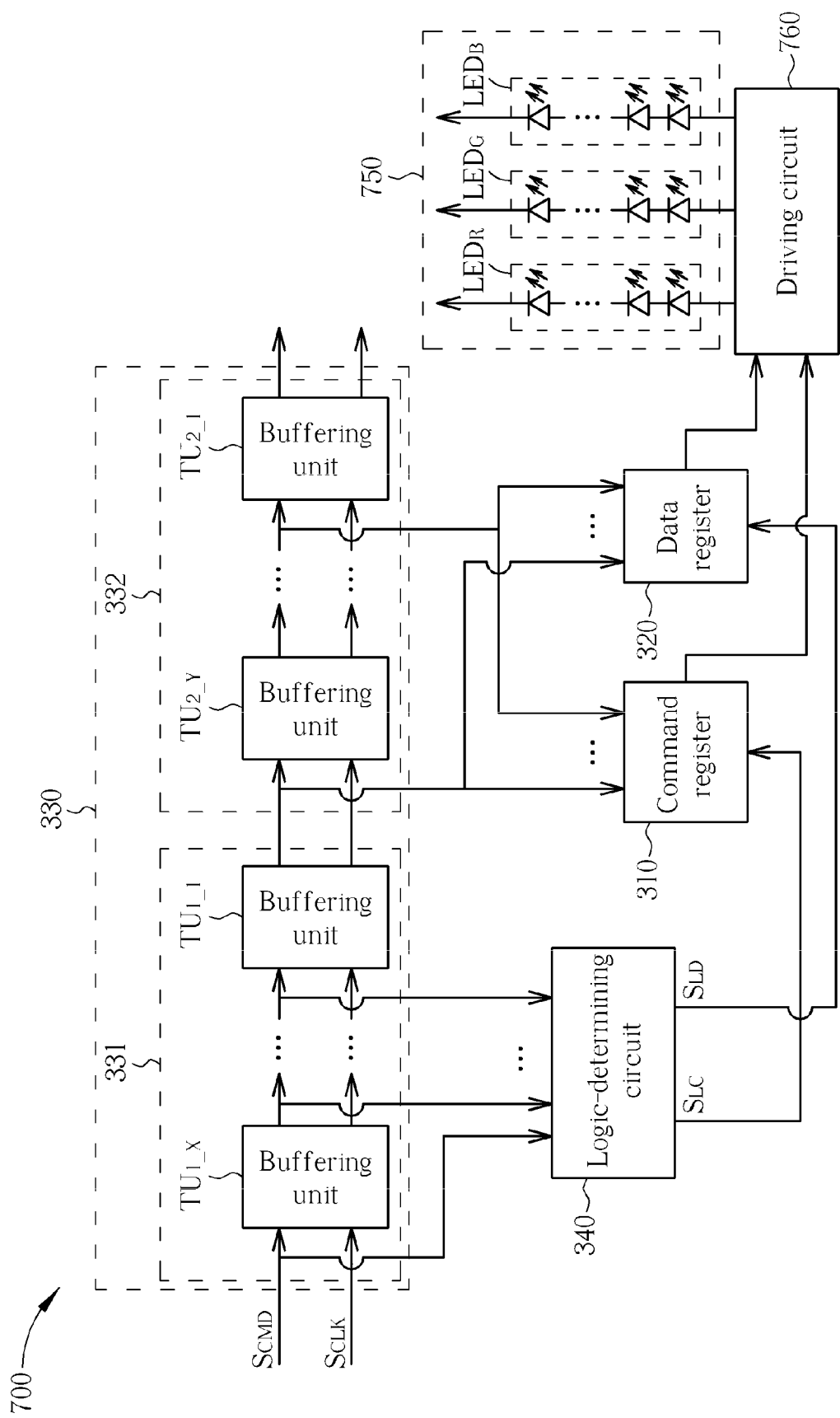
FIG. 7 is a diagram illustrating a light-emitting module according to an embodiment of the present invention.

Please refer to FIG. 7. FIG. 7 is a diagram illustrating a light-emitting module 700 according to an embodiment of the present invention. The light-emitting module 700 includes a data-processing module 300, a light-emitting circuit 750, and a driving circuit 760. The driving circuit 760 generates a light-emitting controlling signal $S_{LT}$ (not shown in FIG. 7) according to the command stored in the command register 310 and the data stored in the data register 320. The light-emitting circuit 750 emits light according to the light-emitting controlling signal $S_{LT}$. The light-emitting circuit 750 can be realized by light-emitting diode (LED). For example, the light-emitting circuit 750 includes a plurality of red light-emitting diodes $LED_1$, a plurality of green light-emitting diodes $LED_G$, and a plurality of blue light-emitting diodes $LED_B$. In this way, the driving circuit 760 can control the color and the intensity of the light emitted by the light-emitting circuit 750 according to the data stored in the command register 310 and the data register 320.

Figure 8:
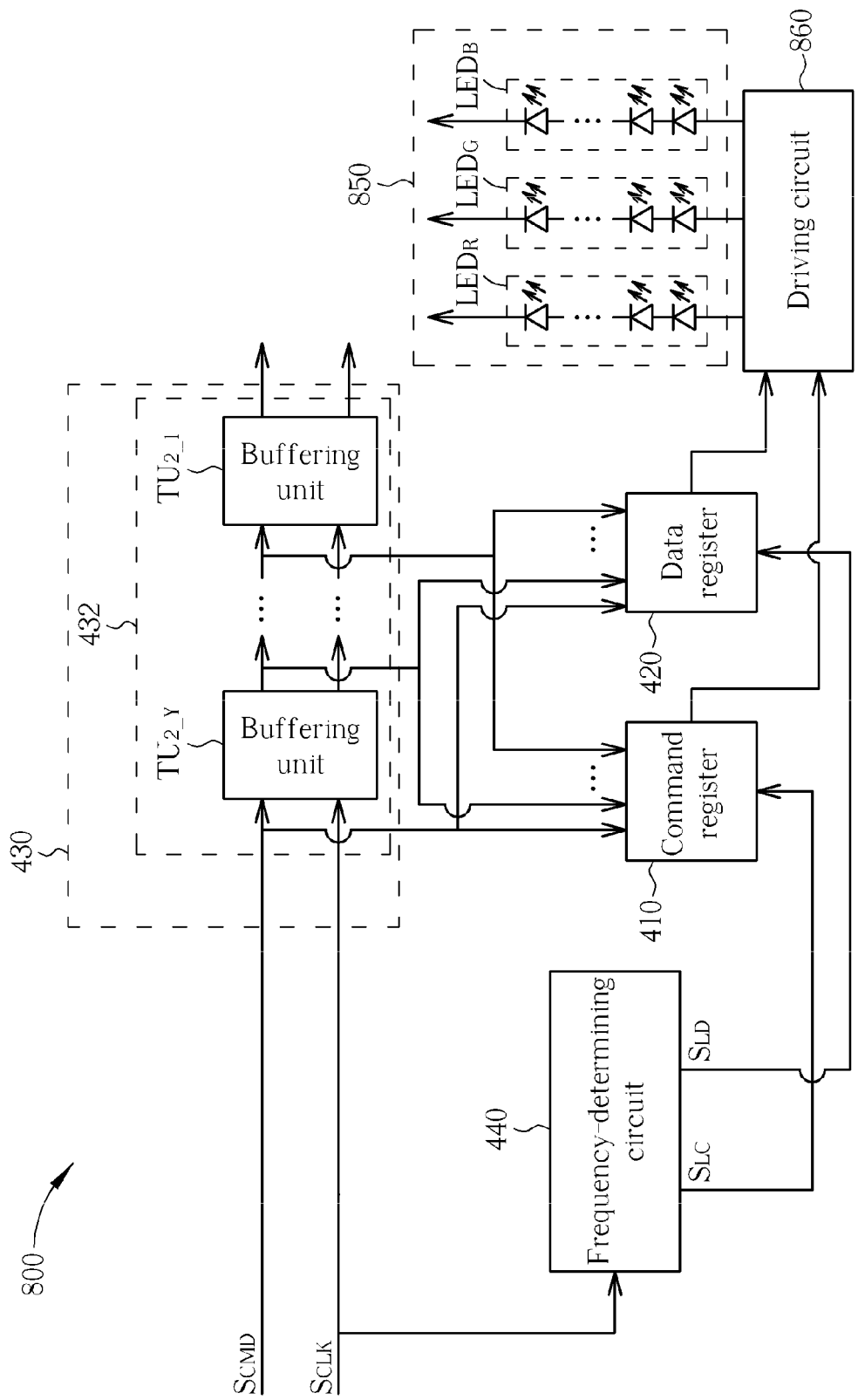
FIG. 8 is a diagram illustrating a light-emitting module according to another embodiment of the present invention.

Please refer to FIG. 8. FIG. 8 is a diagram illustrating a light-emitting module 800 according to another embodiment of the present invention. The light-emitting module 800 includes a data-processing module 400, a light-emitting circuit 850, and a driving circuit 860. The structure and the operation principle of the light-emitting circuit 850 and the driving circuit 860 are respectively similar to those of the light-emitting circuit 750 and the driving circuit 760, and will not be repeated again for brevity. Similarly, the driving circuit 860 can control the color and the intensity of the light emitted by the light-emitting circuit 850 according to the data stored in the command register 410 and the data register 420.

Figure 9:
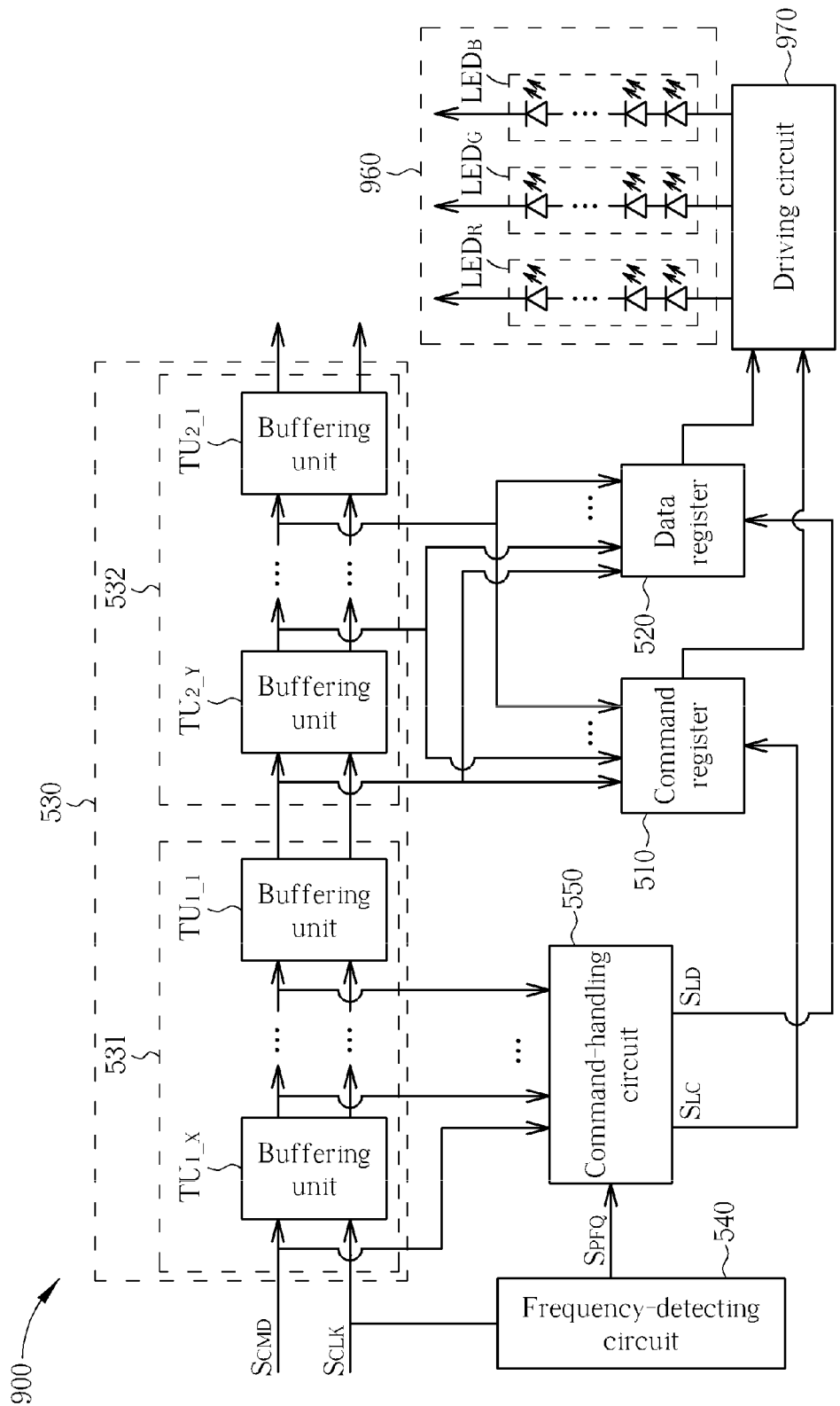
FIG. 9 is a diagram illustrating a light-emitting module according to another embodiment of the present invention.

Please refer to FIG. 9. FIG. 9 is a diagram illustrating a light-emitting module 900 according to another embodiment of the present invention. The light-emitting module 900 includes a data-processing module 500, a light-emitting circuit 960, and a driving circuit 970. The structure and the operation principle of the light-emitting circuit 960 and the driving circuit 970 are respectively similar to those of the light-emitting circuit 750 and the driving circuit 760, and will not be repeated again for brevity. Similarly, the driving circuit 970 can control the color and the intensity of the light emitted by the light-emitting circuit 960 according to the data stored in the command register 510 and the data register 520.

Figure 10:
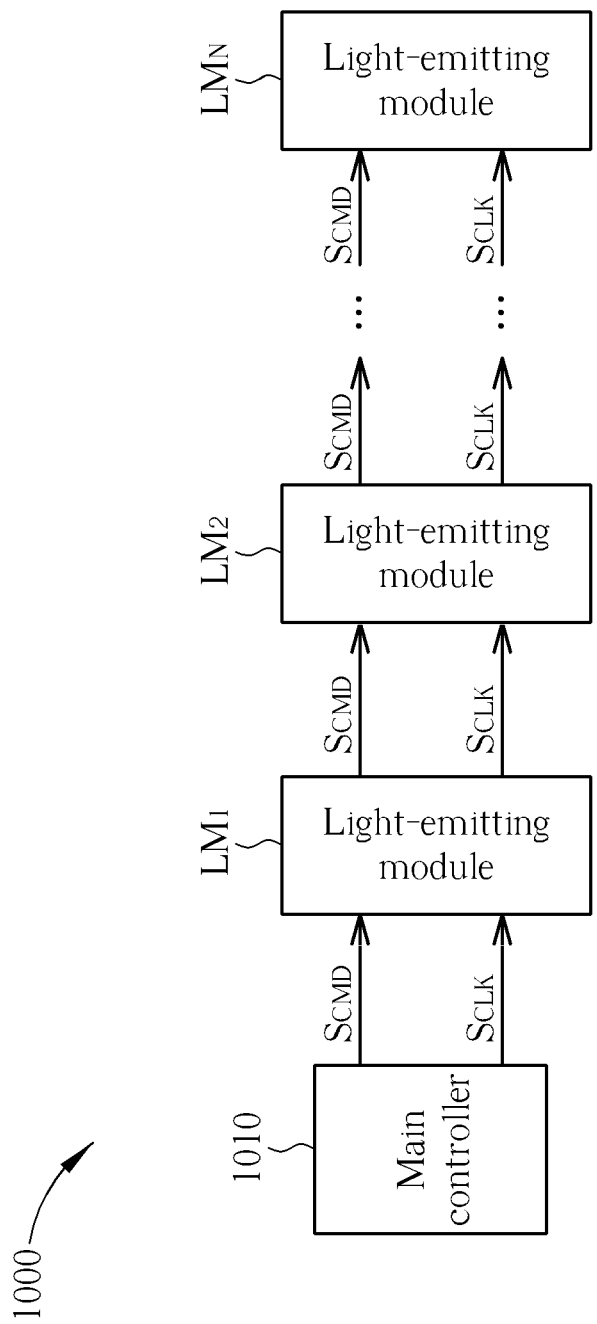
FIG. 10 is a diagram illustrating a display system according to an embodiment of present invention.

Please refer to FIG. 10. FIG. 10 is a diagram illustrating a display system 1000 according to an embodiment of present invention. The display system includes a main controller 1010, and light-emitting modules $LM_1 \sim LM_N$. The main controller 1010 is utilized for generating the clock signal $S_{CLK}$ and the command serial signal $S_{CMD}$. The structure and operation principle of the light-emitting modules $LM_1 \sim LM_N$ are similar to those of the light-emitting modules 700, 800, or 900, and will be omitted for brevity. The FIFO buffering circuits of the data-processing modules of the light-emitting modules $LM_1 \sim LM_N$ are coupled in series. In the display system 1000, the main controller 1010 can control the color and the intensity of the light emitted by the light-emitting modules $LM_1 \sim LM_N$ by means of the clock signal $S_{CLK}$ and the command serial signal $S_{CMD}$. In addition, since in the display system 1000, each light-emitting module $LM_1 \sim LM_N$ does not require an additional pin as the latch pin, the cost of the display system 1000 is reduced.

In conclusion, the present invention provides a data-processing module capable of handling a predetermined command transmitted by a corresponding controller through a command serial signal or a clock signal. The data-processing module of the present invention controls the command register storing the data transmitted by the command serial signal stored in the FIFO buffering circuit so as to latch command, or controls the data register storing the data transmitted by the command serial signal stored in the FIFO buffering circuit so as to latch data, according to the predetermined command. In this way, the data-processing module of the present invention does not require an additional pin as the latch pin. Hence, the cost of the data-processing module is reduced. The present invention further provides a cascading data-transmitting system by means of the data-processing module of the present invention. Since in the cascading data-transmitting system of the present invention, each data-processing module of the present invention does not require an additional pin as the latch pin, the cost of the cascading data-transmitting system is reduced. In addition, on the basis of the data-processing module, the present invention provides a light-emitting module applied in the large display system to reduce the cost of the display system, causing a great convenience.

Those skilled in the art will readily observe that numerous modifications and alterations of the device and method may be made while retaining the teachings of the invention.

What is claimed is:

1. A data-processing module, for handling a command serial signal, capable of being connected in series so as to form a cascading data-transmitting system, the data-processing module comprising:
    a command register;
    a data register;
    a first-in-first-out (FIFO) buffering circuit, for transmitting and temporarily storing the command serial signal according to a clock signal; and
    a logic-determining circuit, for determining if a first section of the command serial signal is a predetermined command according to a first bit, a second bit, and a third bit of the first section of the command serial signal temporarily stored in the FIFO buffering circuit;
    wherein the first bit is adjacent to the second bit, and the second bit is adjacent to the third bit;
    wherein when the first, the second, and the third bits conform to a data type, the logic-determining circuit determines the first section is the predetermined command, and the logic-determining circuit controls the command register or the data register to store data transmitted by a second section of the command serial signal.

2. The data-processing module of claim 1, wherein the FIFO buffering circuit comprises:
    a first buffer, for temporarily storing the first section of the command serial signal; and
    a second buffer, for temporarily storing the second section of the command serial signal.

3. The data-processing module of claim 2, wherein when a logic of the first bit is equal to a logic of the third bit, and the logic of the first bit is different from a logic of the second bit, the first, the second, and the third bits conform to the data type.

4. The data-processing module of claim 3, wherein when the first and the third bits both represent a first predetermined logic, and the second bit represents a second predetermined logic, the predetermined command represents command-latching, and the logic-determining circuit controls the command register to store the data transmitted by the second section of the command serial signal stored in the second buffer.

5. The data-processing module of claim 4, wherein when the first and the third bits both represent the second predetermined logic, and the second bit represents the first predetermined logic, the predetermined command represents data-latching, and the logic-determining circuit controls the data register to store the data transmitted by the second section of the command serial signal stored in the second buffer.

6. The data-processing module of claim 3, wherein the third bit is adjacent to a fourth bit; the fourth bit is adjacent to a fifth bit; the fifth bit is adjacent to a sixth bit; when the first, the third, and the fifth bits all represent a first predetermined logic, and the second, the fourth, and the sixth bits all represent a second predetermined logic, the predetermined command represents command-latching, and the logic-determining circuit controls the command register to store the data transmitted by the second section of the command serial signal stored in the second buffer.

7. The data-processing module of claim 6, wherein when the first, the third, the fourth, and the fifth bits all represent the first predetermined logic, and the second, and the sixth bits both represent the second predetermined logic, the predetermined command represents data-latching, and the logic-determining circuit controls the data register to store the data transmitted by the second section of the command serial signal stored in the second buffer.

8. The data-processing module of claim 3, wherein the third bit is adjacent to a fourth bit; the fourth bit is adjacent to a fifth bit; the fifth bit is adjacent to a sixth bit; when the first, the third, and the fifth bits all represent a first predetermined logic, and the second, the fourth, and the sixth bits all represent a second predetermined logic, the predetermined command represents data-latching, and the logic-determining circuit controls the data register to store the data transmitted by the second section of the command serial signal stored in the second buffer.

9. The data-processing module of claim 8, wherein when the first, the third, the fourth, and the fifth bits all represent the first predetermined logic, and the second, and the sixth bits both represent the second predetermined logic, the predetermined command represents command-latching, and the logic-determining circuit controls the command register to store the data transmitted by the second section of the command serial signal stored in the second buffer.

10. A cascading data-transmitting system, comprising:
    a main controller, for generating a clock signal and a command serial signal; and
    a plurality of the data-processing modules of claim 1, for receiving the clock signal so as to handle the command serial signal;
    wherein the FIFO buffering circuits of the plurality of the data-processing modules of claim 1 are coupled in series.

11. A light-emitting module, comprising:
    the data-processing module of claim 1, for handling a command serial signal;
    a light-emitting circuit, for emitting light according to a light-emitting controlling signal; and
    a driving circuit, for generating the light-emitting controlling signal according to data stored in the data register of the data-processing module of claim 1, and a command stored in the command register of the data-processing module of claim 1.

12. The light-emitting module of claim 11, wherein the light-emitting circuit is realized by light-emitting diode.

13. A display system, comprising:
a main controller, for generating a clock signal and a command serial signal; and
a plurality of the light-emitting modules of claim 11, for receiving the clock signal so as to handle the command serial signal and accordingly emit light;
wherein the FIFO buffering circuits of the data-processing modules of the plurality of the light-emitting modules of claim 11 are coupled in series.

14. A data-processing module, for handling a command serial signal, capable of being connected in series so as to form a cascading data-transmitting system, the data-processing module comprising:
a command register;
a data register;
a first-in-first-out (FIFO) buffering circuit, for transmitting and temporarily storing the command serial signal according to a clock signal, the FIFO buffering circuit comprising a first buffer, for temporarily storing the command serial signal; and
a frequency-determining circuit, for detecting a frequency of the clock signal so as to control the command register or the data register to store data transmitted by the command serial signal;
wherein when the frequency-determining circuit determines the frequency of the clock signal is equal to a first predetermined frequency, the frequency-determining circuit controls the command register to store the data transmitted by the command serial signal stored in the first buffer.

15. The data-processing module of claim 14,
wherein when the frequency-determining circuit determines the frequency of the clock signal is equal to a second predetermined frequency, the frequency-determining circuit controls the data register to store the data transmitted by the command serial signal stored in the first buffer.

16. A cascading data-transmitting system, comprising:
a main controller, for generating a clock signal and a command serial signal; and
a plurality of the data-processing modules of claim 14, for receiving the clock signal so as to handle the command serial signal;
wherein the FIFO buffering circuits of the plurality of the data-processing modules of claim 14 are coupled in series.

17. A light-emitting module, comprising:
the data-processing module of claim 14, for handling a command serial signal;
a light-emitting circuit, for emitting light according to a light-emitting controlling signal; and
a driving circuit, for generating the light-emitting controlling signal according to data stored in the data register of the data-processing module of claim 14, and a command stored in the command register of the data-processing module of claim 14.

18. The light-emitting module of claim 17, wherein the light-emitting circuit is realized by light-emitting diode.

19. A display system, comprising:
a main controller, for generating a clock signal and a command serial signal; and
a plurality of the light-emitting modules of claim 17, for receiving the clock signal so as to handle the command serial signal and accordingly emit light;
wherein the FIFO buffering circuits of the data-processing modules of the plurality of the light-emitting modules of claim 17 are coupled in series.

20. A data-processing module, for handling a command serial signal, capable of being connected in series so as to form a cascading data-transmitting system, the data-processing module comprising:
a command register;
a data register;
a first-in-first-out (FIFO) buffering circuit, for transmitting and temporarily storing the command serial signal according to a clock signal; and
a frequency-detecting circuit, for detecting a frequency of the clock signal so as to generate a predetermined-frequency signal;
wherein when the frequency-detecting circuit determines the frequency of the clock signal is equal to a predetermined frequency, the frequency-detecting circuit generates the predetermined-frequency signal; and
a command-handling circuit, for determining if a first section of the command serial signal is a predetermined command according to the predetermined-frequency signal, and controlling the command register or the data register to store data transmitted by a second section of the command serial signal according the predetermined command.

21. The data-processing module of claim 20, wherein the FIFO buffering circuit comprises:
a first buffer, for temporarily storing the first section of the command serial signal; and
a second buffer, for temporarily storing the second section of the command serial signal.

22. The data-processing module of claim 21, wherein when the predetermined command represents command-latching, the command-handling circuit controls the command register to store the data transmitted by the second section of the command serial signal stored in the second buffer.

23. The data-processing module of claim 22, wherein when the predetermined command represents data-latching, the command-handling circuit controls the data register to store the data transmitted by the second section of the command serial signal stored in the second buffer.

24. A cascading data-transmitting system, comprising:
a main controller, for generating a clock signal and a command serial signal; and
a plurality of the data-processing modules of claim 20, for receiving the clock signal so as to handle the command serial signal;
wherein the FIFO buffering circuits of the plurality of the data-processing modules of claim 20 are coupled in series.

25. A light-emitting module, comprising:
the data-processing module of claim 20, for handling a command serial signal;
a light-emitting circuit, for emitting light according to a light-emitting controlling signal; and
a driving circuit, for generating the light-emitting controlling signal according to data stored in the data register of the data-processing module of claim 20, and a command stored in the command register of the data-processing module of claim 20.

26. The light-emitting module of claim 25, wherein the light-emitting circuit is realized by light-emitting diode.

27. A display system, comprising:
a main controller, for generating a clock signal and a command serial signal; and a plurality of the light-emitting modules of claim 25, for receiving the clock signal so as to handle the command serial signal and accordingly emit light;

wherein the FIFO buffering circuits of the data-processing modules of the plurality of the light-emitting modules of claim 25 are coupled in series.

28. A data-processing method applied in a data-processing module, the data-processing module having a command register, a data register, and a first-in-first-out (FIFO) buffering circuit, the FIFO buffering circuit transmitting and temporarily storing a command serial signal according to a clock signal, the FIFO buffering circuit having a first buffer and a second buffer, the first buffer being utilized for temporarily storing a first section of the command serial signal, the second buffer being utilized for temporarily storing a second section of the command serial signal, the first section of the command serial signal stored in the first buffer having a first bit, a second bit, and a third bit, the first bit being adjacent to the second bit, the second bit being adjacent to the third bit, the data-processing method comprising:

determining the first section is a predetermined command when the first, the second, and the third bits conform to a data type;

controlling the command register to store data transmitted by the second section of the command serial signal stored in the second buffer when the predetermined command represents command-latching; and controlling the data register to store the data transmitted by the second section of the command serial signal stored in the second buffer when the predetermined command represents data-latching.

29. The data-processing method of claim 28, wherein when a logic of the first bit is equal to a logic of the third bit, and the logic of the first bit is different from a logic of the second bit, the first, the second, and the third bits conform to the data type.

30. The data-processing method of claim 28, wherein when the first and the third bits both represent a first predetermined logic, and the second bit represents a second predetermined logic, the predetermined command represents command-latching; when the first and the third bits both represent the second predetermined logic, and the second bit represents the first predetermined logic, the predetermined command represents data-latching.

31. The data-processing method of claim 28, wherein the third bit is adjacent to a fourth bit; the fourth bit is adjacent to a fifth bit; the fifth bit is adjacent to a sixth bit; when the first, the third, and the fifth bits all represent a first predetermined logic, and the second, the fourth, and the sixth bits all represent a second predetermined logic, the predetermined command represents command-latching; when the first, the third, the fourth, and the fifth bits all represent the first predetermined logic, and the second, and the sixth bits both represent the second predetermined logic, the predetermined command represents data-latching.

32. The data-processing method of claim 28, wherein the third bit is adjacent to a fourth bit; the fourth bit is adjacent to a fifth bit; the fifth bit is adjacent to a sixth bit; when the first, the third, and the fifth bits all represent a first predetermined logic, and the second, the fourth, and the sixth bits all represent a second predetermined logic, the predetermined command represents data-latching; when the first, the third, the fourth, and the fifth bits all represent the first predetermined logic, and the second, and the sixth bits both represent the second predetermined logic, the predetermined command represents command-latching.

33. A data-processing method applied in a data-processing module, the data-processing module having a command register, a data register, and a first-in-first-out (FIFO) buffering circuit, the FIFO buffering circuit transmitting and temporarily storing a command serial signal according to a clock signal, the FIFO buffering circuit having a first buffer, the first buffer being utilized for temporarily storing the command serial signal, the data-processing method comprising:

controlling the command register to store data transmitted by the command serial signal stored in the first buffer when determining a frequency of the clock signal is equal to a first predetermined frequency; and controlling the data register to store the data transmitted by the command serial signal stored in the first buffer when determining the frequency of the clock signal is equal to a second predetermined frequency.

34. A data-processing method applied in a data-processing module, the data-processing module having a command register, a data register, and a first-in-first-out (FIFO) buffering circuit, the FIFO buffering circuit transmitting and temporarily storing a command serial signal according to a clock signal, the FIFO buffering circuit having a first buffer and a second buffer, the first buffer being utilized for temporarily storing a first section of the command serial signal, the second buffer being utilized for temporarily storing a second section of the command serial signal, the data-processing method comprising:

determining the first section of the command serial signal stored in the first buffer is a predetermined command when determining a frequency of the clock signal is equal to a predetermined-frequency;

controlling the command register to store data transmitted by the second section of the command serial signal stored in the second buffer when the predetermined command represents command-latching; and controlling the data register to store the data transmitted by the second section of the command serial signal stored in the second buffer when the predetermined command represents data-latching.

* * * * *